United States Patent [19]
McCord

[11] Patent Number: 4,848,281
[45] Date of Patent: Jul. 18, 1989

[54] PULSE CHAMBER AND SUPERCHARGING APPARATUS FOR INTERNAL COMBUSTION ENGINES

[76] Inventor: Ronald R. McCord, 23 McCord Rd., Roundup, Mont. 59072

[21] Appl. No.: 126,404

[22] Filed: Nov. 30, 1987

[51] Int. Cl.[4] .............................................. F02B 27/00
[52] U.S. Cl. .................................. 123/52 M; 60/324; 181/240
[58] Field of Search ......... 123/52 ML, 52 M, 52 MC, 123/52 MB; 60/324; 181/240

[56] References Cited

U.S. PATENT DOCUMENTS

| | | | |
|---|---|---|---|
| 2,206,193 | 7/1940 | Kadenacy | 60/324 |
| 2,910,830 | 11/1959 | White | 60/324 |
| 3,059,423 | 10/1962 | Berlyn | 60/312 |
| 3,177,973 | 4/1965 | Benes | 60/324 |
| 4,094,277 | 6/1978 | Goto et al. | 123/52 MF |
| 4,206,600 | 6/1980 | Feuling | 60/312 |
| 4,474,145 | 10/1984 | Boyesen | 123/73 PP |
| 4,538,555 | 9/1985 | Kite | 123/52 MB |
| 4,590,895 | 5/1986 | Yada et al. | 123/52 MB |
| 4,592,310 | 6/1986 | Hitomi et al. | 123/52 M |
| 4,643,138 | 2/1987 | Ruf et al. | 123/52 M |

FOREIGN PATENT DOCUMENTS

| | | | |
|---|---|---|---|
| 0019813 | 2/1977 | Japan | 60/324 |
| 0091328 | 5/1983 | Japan | 123/52 MB |

Primary Examiner—David A. Okonsky
Attorney, Agent, or Firm—William D. West

[57] ABSTRACT

An intake and exhaust flow improvement device for internal combustion engines is disclosed. The invention provides an anti-reversion chamber having a gas-redirecting profile on the intake side as well as providing a gas-redirecting profile on the exhaust side. The device also provides for toroidal loops placed within the exhaust and intake manifolds to have a swirling flow-enhancing effect by which the intake charge is continued to be held ready for the next opening of the intake valve and whereby the exhaust gases are smoothly exited from the exhaust manifold by providing a loop pathway to continue the one-way energy of the exhaust gases.

5 Claims, 3 Drawing Sheets

PULSE CHAMBER AND SUPERCHARGING APPARATUS FOR INTERNAL COMBUSTION ENGINES

BACKGROUND OF THE INVENTION

1. Field of the Invention

The invention relates to an intake and exhaust flow improvement device for internal combustion engines and in particular to such a device in which the intake and exhaust flows are improved without the use of engine-driven moving parts.

2. Discussion of the Technical Problems

Internal combustion engines suffer from a phenomenon in which the gases, including air-fuel mixture, being ingested into the engine in the intake side as well as exhaust gases being exited the engine, do not move into the engine and away from the engine in constant flow patterns. The design of internal combustion engines has necessitated that intake and exhaust valves are opened and closed at different times so that intake flows as well as exhaust flows are abruptly stopped and in some cases reversed.

It has been noted that an adverse process known as reversion has occurred in internal combustion engines where the exhaust from combustion dilutes the incoming air-fuel charge, thus reducing the combustion potential. The reversion takes place when back pressure resistance imposed by an exhaust system causes the by-product of combustion to flow in reverse through the intake system when valve overlap occurs. This period of overlap when the exhaust valve is still closing and the intake is already beginning to open varies, depending on the engine design. Reversion robs the engine of horsepower. Due to valve overlap and other design problems with internal combustion engines, the air-fuel mixture can in some cases actually reverse and instead of flowing in a direction toward the engine when demanded by the engine, would be flowing instead away from the engine, thus diluting the charge available within the engine. Such a counterflow reduces engine performance considerably.

In order to limit the problem of counterflows and the dilution effect of having exhaust gases mingle with intake gas mixtures, a system employing reed valves has been utilized. Such a system is disclosed in U.S. Pat. No. 4,474,145 to Boyesen issued Oct. 2, 1984. The Boyesen reference also discloses the use of certain shapes within the flow passage upstream of the reed valves to affect the flow of the fuel-air mixture into the engine.

U.S. Pat. No. 4,206,600 to Feuleng issued June 10, 1986 discloses the use of overlapping converging conical pipes to provide additional scavenging of exhaust gases at high piston speeds. The Feuleng patent relies upon a venturi principle to increase the velocity of the exhaust gases in order to enhance the scavenging effect.

U.S. Pat. No. 4,094,277 to Goto et al. issued June 13, 1978 discloses an intake valve mechanism for preventing backflow of exhaust gases which utilizes a separate backflow valve.

While the prior art devices disclose the existence of the problem of having counterflow, reversion and intake exhaust mingling in internal combustion engines, they generally approach the problem through the use of moving parts such as having additional valves or by relyiing upon a venturi effect to further increase the velocity of the gases.

Instead of relying upon additional mechanical valves which serve to extract energy from the engine, it would be desirable to have a device which would improve upon both intake and exhaust flows while maintaining those flows in a constant direction to obtain the desired effects upon the engine by having the flows continue in one direction while not being dependent upon exacting an energy cost from the engine itself. The instant invention is directed toward such a device.

No known examples of intake or exhaust devices have been discovered which teach maintaining exhaust and intake flows in a constant direction by use of specially designed chambers and flow circuits.

Such a device, when fitted on an engine, should in essence provide increased engine efficiency by having a more precise fuel/air mixture available on the intake side of the engine while still removing the exhaust gasses in an efficient manner. By employing such a device, the engine thus runs at cooler operating temperatures, runs cleaner, and develops more power. Such a device would allow an engine to employ a smaller or larger carburetor or fuel injection jets and be easily adapted to existing engines without taking energy from the engine to operate the device.

Accordingly, a need exists for an intake and exhaust flow improvement device for internal combustion engines that would provide a safe, convenient, simple, inexpensive apparatus that could be attached to the intake manifold as well as the exhaust manifold of an internal combustion engine that would improve the efficiency of the engine. Such a device should be uncomplicated in design, easily installed into existing engines, easily repaired, not subject to damage by proper use, and simple to manufacture. The instant invention is directed to all of these needs as well as to others as explained in the following summary.

SUMMARY OF THE INVENTION

It is a feature of the invention to provide an intake and exhaust flow improvement device for internal combustion engines.

It is another feature of the instant invention to provide a pulse chamber flow director for directing and improving intake flows for internal combustion engines.

It is another feature of the instant invention to provide a pulse chamber flow director for directing and improving exhaust flows for internal combustion engines.

It is another feature of the instant invention to provide a continuous circuit for improving intake flows for internal combustion engines.

It is another feature of the instant invention to provide a continuous circuit for improving exhaust flows for internal combustion engines.

These and other features and objects are attained according to the instant invention by providing intake and exhaust pulse chambers which direct the flow in one direction so that the flow, if reversed near the surface of the chamber, restrictions are provided to reverse the flow in a circular manner, thereby causing the flow to continue in one direction despite the opening and closing of exhaust and intake valves. Additionally, toroidal pathways are provided in both the intake and the exhaust side of the internal combustion engine to reroute the moving exhaust gases or fuel-air mixtures to ensure that those gases are continuing to move in the same direction.

The intake loop works by providing an alternate route for the intake charge after the intake valve has closed and with the circular or toroidal design it creates a supercharging effect. The loop thus provides a maximum intake charge at all engines speeds. The exhaust loop, on the other hand, works much like the intake loop by providing an alternative route for the exhaust pulses and creates a super exhaust effect. The combined effects of the loop as well as a pulse chamber provide a significant increase in power over an extremely broad range of engine speeds. The device accomplishes the increase in power by: (1) restricting the backward intake pulse within the pulse chamber; (2) by supercharging through the use of the intake loop; (3) by restricting the backward exhaust pulse within the pulse chamber; and (4) by pulling the exhaust through the loop, thus reducing the pressure on the exhaust side to create greater exhaust and smoother exhaust velocities. The primary advantages of using the intake and exhaust flow improvement device for internal combustion engines in the present invention are to provide easier starting, eliminate vapor lock, eliminate throttle hesitation, produce a cooler and cleaner running engine, provide a constant mixture, provide a swirling improved blending of the intake mixture, provide a mixture which appears not to be as octane-sensitive, provide a broader power band, allow the use of a variety of carburetors with the same engine to provide larger power or greater economy, to make it easier to adjust the misture of the engine, and to cool the exhaust gasses. It has also been found that the device, by not having any moving parts, does not extract energy from the engine. It also does not restrict the exhaust gasses and provides a quieter running engine.

BRIEF DESCRIPTION OF THE DRAWINGS

The advantages of this invention will become apparent upon consideration of the following detailed disclosure of the invention, especially when taken in conjunction with the accompanying drawings, wherein.

DESCRIPTION OF THE PREFERRED EMBODIMENT

Figure 1:
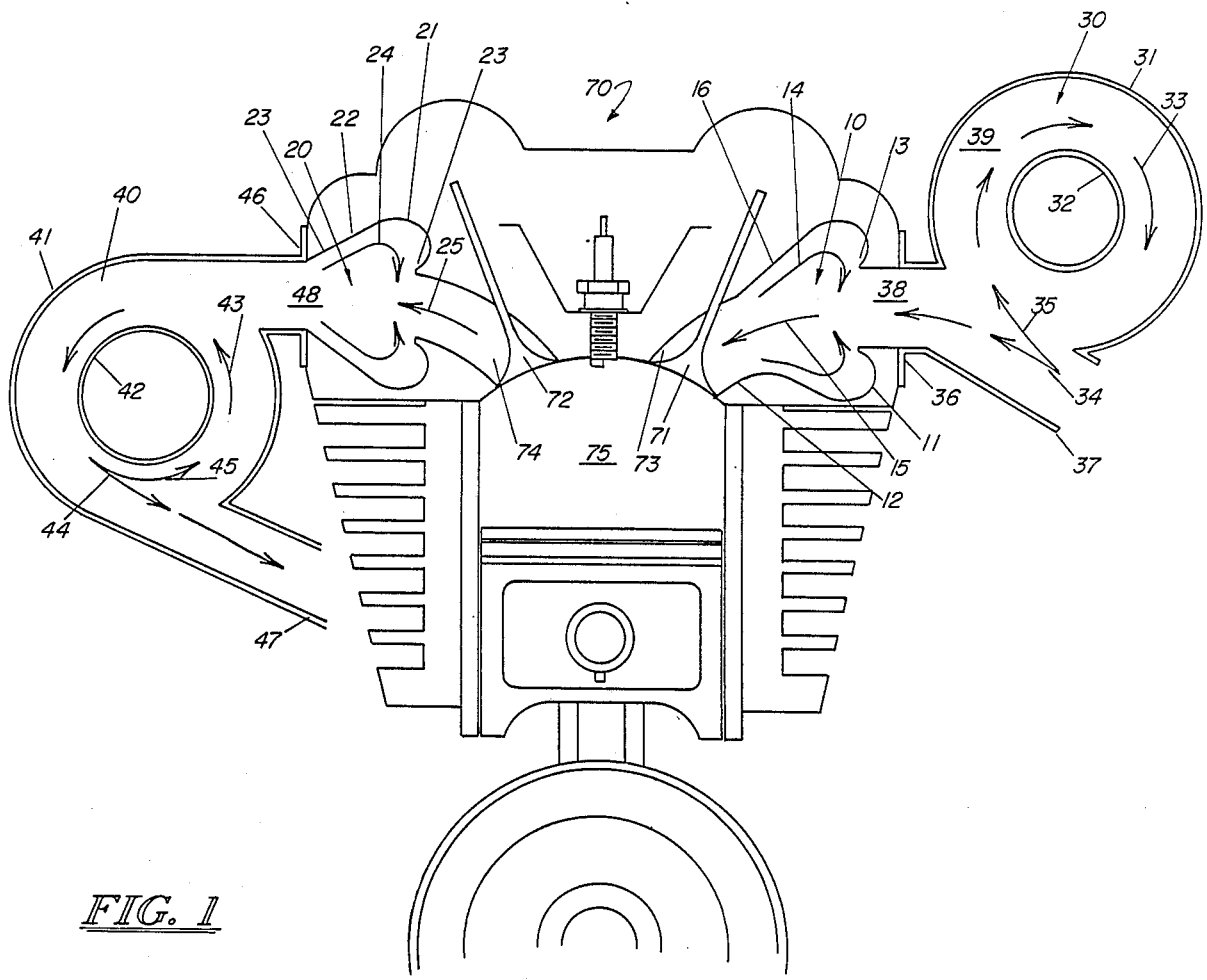
FIG. 1 is a cutaway view of an internal combustion engine having an intake pulse chamber, an exhaust pulse chamber, an intake loop and an exhaust loop attached thereto in accordance with the present invention.

The intake and exhaust flow improvement device for internal combustion engines of the instant invention is depicted generally in FIG. 1. As can be seen by reference to FIG. 1 a representative view of an internal combustion engine 70 is shown in which an intake valve 71 and an exhaust valve 72 are situated in intake port 73 and exhaust port 74 respectively. The improvement device provides an exhaust loop 40. As shown in FIG. 1, intake and exhaust pulse chambers 10 and 20 are constructed as an integral part of the head of internal combustion engine 70 and intake loop 30 and exhaust loop 40 are attached externally to engine 70. The particular configuration as shown in FIG. 1 is subject to many modifications as the various pulse chambers and loops may be cast as an integral part component of the engine 70 or they may be separate parts which could be attached to existing engines without major modifications.

Still with reference to FIG. 1 it can be seen that pulse chamber 10 is a chamber having an elongated or enlarged inlet end 11 which is larger than the outlet end 12 which is arranged so that when intake gasses 38 arrive at inlet neck 13, they are directed through the center 15 of pulse chamber 10 to be ready to be pulled into the combustion chamber 75 when intake valve 71 is opened. When intake valve 71 closes, the movement of the intake gasses stop and often reverse direction along the outside or peripheral wall 16. The opening and closing of valve 71 causes an abrupt stoppage of the flow 15 of intake gasses. By use of pulse chamber 10 as can be seen in FIG. 1 the reversed gasses 14 along outer wall 16 when reaching the enlarged inlet chambers 11 flow in a smooth, uninterrupted manner so as to reverse the direction along a sidewall before rejoining intake gasses 15, thus redirecting intake gasses 15. The gasses have a more uniform pressure to allow a uniform fuel/air mixture to be available as soon as intake valve 71 opens and provide a proper charge to be ingested into combustion chamber 75.

Still with reference to FIG. 1 it can be seen that intake loop 30 is also attached to the intake side of engine 70 and it is attached between the carburetor (not shown) and intake valve 71. In the particular embodiment as depicted in FIG. 1 intake loop 30 is attached upstream of pulse chamber 10 to further enhance consistent fuel/air intake mixtures. The enhanced mixtures are made possible by the use of loop 30 in that fuel/air mixture 34 arriving from the carburetor is directed both into loop 39 as well as into intake 38. If intake valve 71 is open, the proper mixture is directed into combustion chamber 75. When intake valve 71 closes, the portion of fuel/air mixture 35 which is directed into loop 39 moves around loop 39 and provides a continuous flow about loop 39 before rejoining fuel/air mixture 34 to be ready when intake valve 71 is open. The intake loop 30 thus provides a supercharging effect by raising the pressure of the gasses and by having the charge constantly ready for the opening of intake valve 71.

Intake loop 30 is comprised of an outer wall 31 and inner wall 32 thus comprising a toroidal or donut shape which is so positioned within the intake so as to allow a splitting of fuel/air mixture 34 as previously described. In the embodiment as depicted in FIG. 1, intake loop 30 is attached by flanges 36 onto the intake port 38 of the engine 70.

On the exhaust side of internal combustion engine 70 it can be seen that exhaust gasses 25 exit combustion chamber 75 when exhaust valve 72 opens. Exhaust port 74 is provided with exhaust pulse chamber 20 in which the inlet portion 21 of pulse chamber 20 is larger is diameter than the outlet diameter 23 of pulse chamber 20. Once exhaust valve 72 closes, airflow may reverse as depicted by exhaust flow 24 which would then provide a pressure against valve 72 thus limiting the efficiency of the engine. If the exhaust is redirected by pulse chamber 20 by a smooth, uninterrupted flow about pulse chamber inlet ends 21 as depicted in FIG. 1 the exhaust is pulled away from exhaust valve 72. By keeping the exhaust flows consistently flowing away from the combustion chamber 75, the exhaust is more efficiently removed from the engine thus improving the efficiency of the engine. By continuously redirecting the gas flows to a flow away from combustion chamber 75, combustion chamber 75 is effectively scavanged as the pressure within pulse chamber 20 is reduced to help remove spent exhaust gasses.

As depicted in FIG. 1 exhaust loop 40 is attached externally to engine 70 between pulse chamber 20 and exhaust system (not shown).

Exhaust loop 40 is comprised of a toroidal donut shaped ring having an inner diameter 42 and an exterior wall 41. When exhaust gasses 44 are directed about exhaust loop 40, some portion of those exhaust gasses 45 are redirected back into the exhaust loop 40. Those returning exhaust gasses 43 continue around the loop 40 in FIG. 1 so as to provide a continuous flow in one direction, thus helping to pump the exhaust gasses 44 away from engine 70 and out exhaust pipe 47 to further enhance the removal of the spent exhaust gasses.

It can be seen from FIG. 1 that pulse chambers 10 and 20 assist in keeping the flow of gasses in both intake and exhaust to and from the engine in a manner consistent with the efficient operation of the engine and toroidal intake and exhaust loops 30 and 40 provide a pressure increasing and reducing effect, thus improving the efficiency of the engine.

Figure 2:
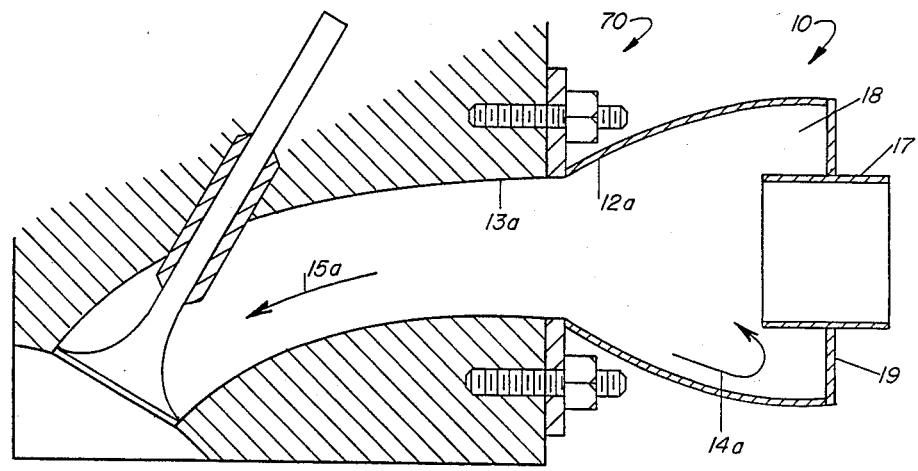
FIG. 2 is a cutaway side elevational view of an intake pulse chamber bolted on in accordance with the present invention to an internal combustion engine.

With reference to FIG. 2 it can be seen that a further embodiment is depicted in which an intake pulse chamber 10 is provided having a reversing pulse chamber 18 so that exhaust gasses 14a are reversed in a manner as previously discussed with respect to FIG. 1. However, intake port 13a is not modified itself. Diameter of inlet portion 17 is substantially the same as intake port 13a. The manner of gas flow with respect to the embodiment as depicted in FIG. 2 is similar to the previous description.

Figure 3:
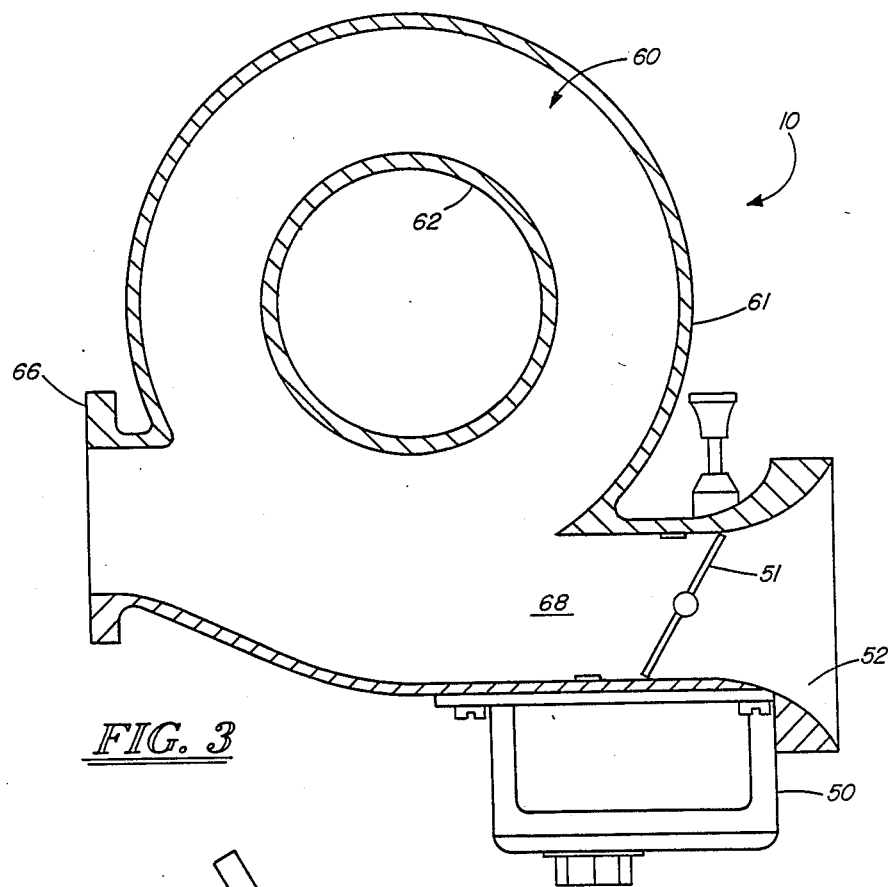
FIG. 3 is a cutaway view of an intake loop as an integral part of a carburetor in accordance with the present invention.

Intake loop 30 as described in FIG. 1 could also be attached as an integral part of a carburetor as depicted in FIG. 3. In FIG. 3 carburetor 50 is provided with intake loop 60 having interior walls 62 and exterior walls 61 to provide an intake loop which can be attached by means of flanges 66 onto an internal combustion engine in a manner well known in the art. The intake loop 60 as depicted in FIG. 3 would operate in the same manner as previously described with respect to intake loop 30.

Figure 4:
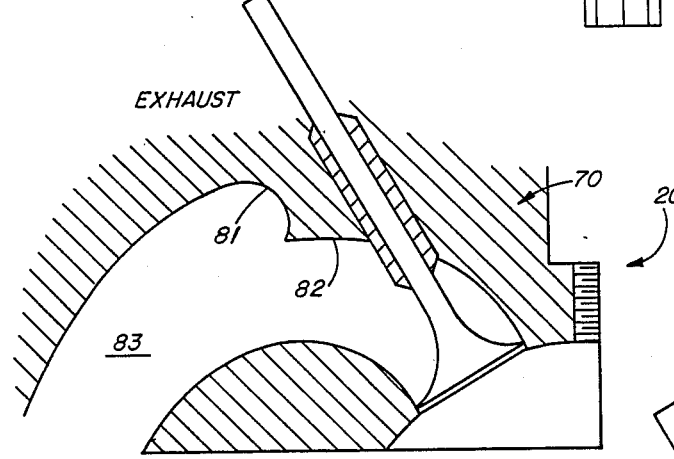
FIG. 4 is a cutaway side elevational view of an exhaust pulse chamber having a single flow reversing side chamber machined into the head of the internal combustion engine.
Figure 5:
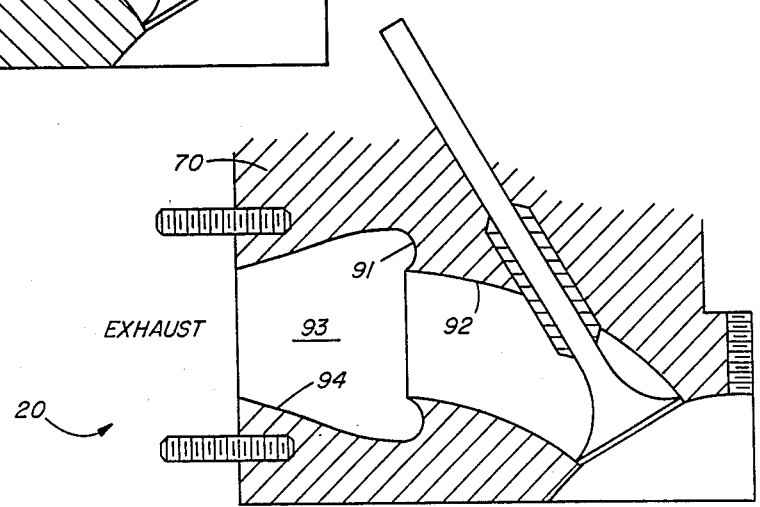
FIG. 5 is a cutaway side elevational view of an exhaust pulse chamber having a symetrical chamber machined into the head of the internal combustion engine.

FIGS. 4 and 5 depict exhaust pulse chambers in accordance with the present invention in which the chambers are modifications of the exhaust ports so that a single gas reversing chamber is provided in the embodiment as depicted in FIG. 4, whereby a totally symetrical chamber 91 is provided as depicted in FIG. 5. The embodiments as shown in FIGS. 4 and 5 depict the various means for redirecting exhaust gas flow by the use of pulse chambers whether symetrical or not.

Figure 6:
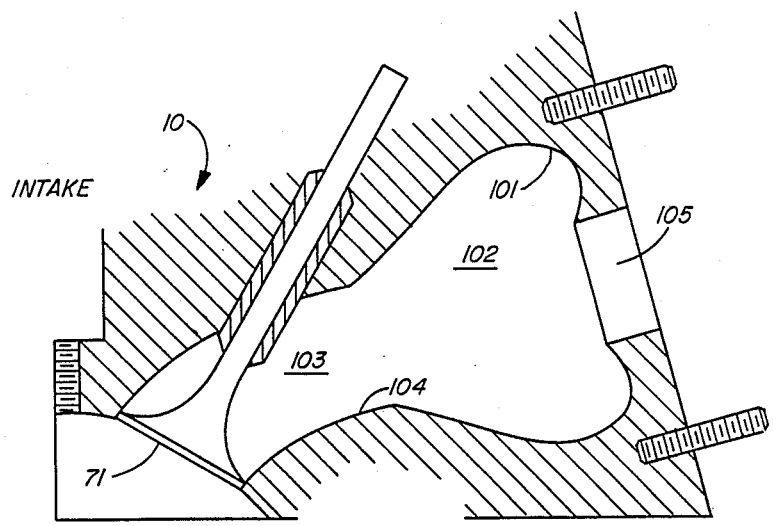
FIG. 6 is a cutaway side elevational view of an intake pulse chamber having a symetrical chamber machined into the head of the internal combustion engine.
Figure 7:
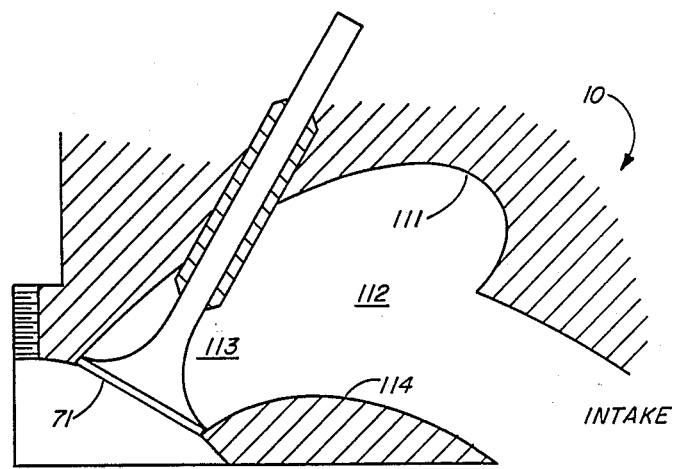
FIG. 7 is a cutaway side elevational view of an intake pulse chamber having a single flow reversing side chamber machined into the head of the internal combustion engine.

Turning now to FIGS. 6 and 7 where it can be seen that intake pulse chambers can also be provided either in a symetrical manner as shown in FIG. 6 or in an asymetrical manner as shown in FIG. 7 so that the gas flows are still reversed so that reversing gas flows are redirected so as to maintain a constant intake charge to be ready to flow into the engine when intake valve 71 opens.

Figure 8:
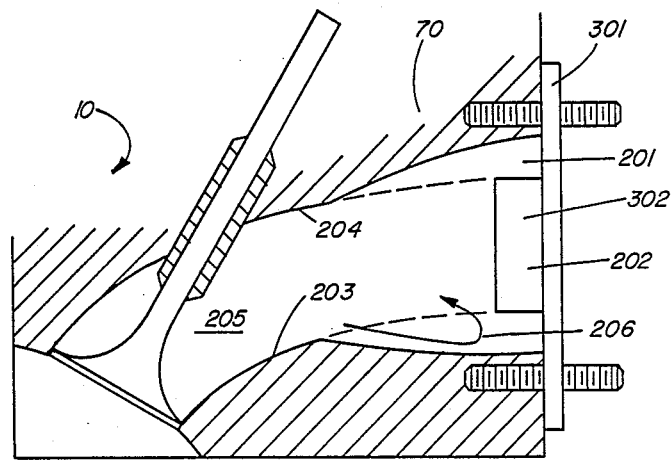
FIG. 8 is a side elevational view of an intake pulse chamber in which the intake port has been enlarged and a bolt-on pulse chamber insert has been added in accordance with the present invention.

FIG. 8 depicts a further bolt on embodiment in which engine 70 has had the intake ports enlarged to provide an enlargment 201 which would provide a redirected flow 206 when adaptor plate 301 and intake ring 302 are bolted onto engine 70. The embodiment as depicted in FIG. 8 allows for a small adaptor plate with ring 302 to be utilized to provide a pulse chamber 10 with only a small modification to the intake port.

Although specific applications, materials, components, connections, sequents of events, and methods have been stated in the above description of the preferred embodiment of the invention, other suitable materials, other applications, components, and process steps as listed here and may be used with satisfactory results in varying degrees of quality. In addition, it will be understood that various other changes in details, materials, steps, arrangements of parts and uses which have been herein described and illustrated in order to explain the nature of the invention will occur to and may be made by those skilled in the art, upon a careful reading of this disclosure, and such changes are intended to be included within the principles and scope of this invention as herein claimed.

I claim:

1. An intake and exhaust flow improvement device for internal combustion engines of the type having an intake and an exhaust, the device comprising:
    an intake pulse chamber means operably connected to said intake; said pulse chamber means having an inlet and an outlet, said inlet having sidewall flow reversing means for reversing gas flowing in an outlet to inlet direction to an inlet to outlet direction within said pulse chamber;
    an intake loop means operably connected to said intake; said intake loop means having an inlet and an outlet; said loop means maintaining the flow direction of gasses from said inlet to said outlet by directing a portion of said gas flow through a continuous toroidal path;
    an exhaust pulse chamber means operably connected to said exhaust; said pulse chamber means having an inlet and an outlet, said inlet having sidewall flow reversing means for reversing gas flowing in an outlet to inlet direction to an inlet to outlet direction within said pulse chamber; and
    an exhaust loop means connected to said exhaust; said exhaust loop means having an inlet and an outlet; said loop means maintaining the flow direction of gasses from said inlet to said outlet by directing a portion of said gas to flow through a continuous toroidal path.

2. The intake and exhaust flow improvement device for internal combustion engines as described in claim 1, wherein said intake loop means is operably connected to said intake pulse chamber means.

3. The intake and exhaust flow improvement device for internal combustion engines as described in claim 1 wherein said exhaust pulse chamber means is operably connected to said exhaust loop means.

4. An intake and exhaust flow improvement device for internal combustion engines of the type having an intake and an exhaust, the device comprising:

an intake pulse chamber means operably connected to said intake; said pulse chamber means having an inlet and an outlet, said inlet having sidewall flow reversing means for reversing gas flowing in an outlet to inlet direction to an inlet to outlet direction within said pulse chamber;

an intake loop means operably connected to said intake; said intake loop means having an inlet and an outlet; said loop means maintaining the flow direction of gasses from said inlet to said outlet by directing a portion of said gas flow through a continuous toroidal path.

5. An intake and exhaust flow improvement device for internal combustion engines of the type having an intake and an exhaust, the device comprising:

an exhaust pulse chamber means operably connected to said exhaust; said pulse chamber means having an inlet and an outlet, said inlet having sidewall flow reversing means for reversing gas flowing in an outlet to inlet direction to an inlet to outlet direction within said pulse chamber; and an exhaust loop means connected to said exhaust; said exhaust loop means having an inlet and an outlet; said loop means maintaining the flow direction of gasses from said inlet to said outlet by directing a portion of said gas to flow through a continuous toroidal path.

* * * * *